United States Patent
Yang et al.

(10) Patent No.: US 11,477,563 B2
(45) Date of Patent: Oct. 18, 2022

(54) TWS EARPHONE, CHARGING CASE, UPGRADING METHOD THEREOF AND STORAGE MEDIUM

(71) Applicant: GOERTEK TECHNOLOGY CO., LTD., Qingdao (CN)

(72) Inventors: Kun Yang, Qingdao (CN); Ying Zhao, Qingdao (CN)

(73) Assignee: GOERTEK TECHNOLOGY CO., LTD., Shandong (CN)

( * ) Notice: Subject to any disclaimer, the term of this patent is extended or adjusted under 35 U.S.C. 154(b) by 160 days.

(21) Appl. No.: 17/057,008

(22) PCT Filed: Jul. 26, 2018

(86) PCT No.: PCT/CN2018/097208
§ 371 (c)(1),
(2) Date: Nov. 19, 2020

(87) PCT Pub. No.: WO2019/237460
PCT Pub. Date: Dec. 19, 2019

(65) Prior Publication Data
US 2021/0136479 A1    May 6, 2021

(30) Foreign Application Priority Data
Jun. 15, 2018    (CN) .......................... 201810621591.2

(51) Int. Cl.
*H04R 1/10*    (2006.01)
*G06F 8/65*    (2018.01)

(52) U.S. Cl.
CPC ............. *H04R 1/1025* (2013.01); *G06F 8/65* (2013.01)

(58) Field of Classification Search
CPC .................... H04R 1/1025; H04R 2460/17; H04R 1/1041; H04R 2225/31; H04R 2225/55; G06F 8/65; H04W 84/20
See application file for complete search history.

(56) References Cited

U.S. PATENT DOCUMENTS

| | | | |
|---|---|---|---|
| 2008/0180874 A1* | 7/2008 | Gauger | H02J 7/0044 361/235 |
| 2009/0088145 A1 | 4/2009 | Inohiza | |

(Continued)

FOREIGN PATENT DOCUMENTS

| | | |
|---|---|---|
| CN | 101167342 A | 4/2008 |
| CN | 104065726 A | 9/2014 |

(Continued)

OTHER PUBLICATIONS

International Search Report, PCT/CN2018/097208 filed Jul. 26, 2018, dated Mar. 21, 2019.

*Primary Examiner* — Kile O Blair
(74) *Attorney, Agent, or Firm* — Workman Nydegger

(57) ABSTRACT

The present invention relates to the technical field of earphones and provides a reasonable and feasible firmware upgrade solution for TWS earphones. Disclosed in the present application are a TWS earphone, a charging case, an upgrading method thereof and a storage medium. The method comprises: acquiring an upgrading firmware package sent by a preset terminal by means of a first audio output device; upgrading the first audio output device by using a first upgrading firmware in the upgrading firmware package acquired by the first audio output device; sending a second upgrading firmware in the upgrading firmware package acquired by the first audio output device to a second audio output device by means of a charging case, so as to upgrade the second audio output device by using the second upgrading firmware. The upgrade solution of the present applica- (Continued)

tion enables a reasonable and feasible firmware upgrade operation of TWS earphones.

15 Claims, 6 Drawing Sheets

(56) References Cited

U.S. PATENT DOCUMENTS

| | | |
|---|---|---|
| 2017/0311105 A1 | 10/2017 | Hariharan et al. |
| 2017/0325016 A1 | 11/2017 | Li et al. |
| 2018/0077485 A1 | 3/2018 | Rush et al. |

FOREIGN PATENT DOCUMENTS

| | | |
|---|---|---|
| CN | 106909337 A | 6/2017 |
| CN | 106997302 A | 8/2017 |
| CN | 207010951 U | 2/2018 |
| CN | 107950014 A | 4/2018 |
| EP | 1473969 A2 | 11/2004 |
| WO | 2016/183712 A1 | 11/2016 |

* cited by examiner

TWS EARPHONE, CHARGING CASE, UPGRADING METHOD THEREOF AND STORAGE MEDIUM

The present application is the national phase of International Patent Application No. PCT/CN2018/097208, titled "TWS EARPHONE, CHARGING CASE, UPGRADING METHOD THEREOF AND STORAGE MEDIUM", filed on Jul. 26, 2018, which claims priority to Chinese Patent Application No. 201810621591.2, titled "TWS EARPHONE, CHARGING CASE, UPGRADING METHOD THEREOF AND STORAGE MEDIUM", filed on Jun. 15, 2018 with the Chinese Patent Office, both of which are incorporated herein by reference in their entireties.

TECHNICAL FIELD

The present disclosure relates to the technical field of headsets, and in particular to a TWS headset, a charging box, a method for upgrading a TWS headset, and a storage medium.

BACKGROUND

True Wireless Stereo (TWS) headsets, which can be easily worn and used independently, are increasingly favored by consumers and have broad market prospects.

In addition to necessary physical devices integrated in the TWS headset, it is required to install firmware for driving the physical devices in the TWS headset. The TWS headset can provide consumers with normal functions through the cooperation of the physical devices and the firmware.

However, due to limited development time or insufficient understanding of the physical devices, it is difficult for firmware developers to develop firmware most suitable for the TWS headset at the start. In many cases, after installing firmware of a version in the TWS headset, the firmware developers may further monitor the vulnerabilities and errors of the current firmware and the incompatibility between the firmware and the physical devices during the actual use of the TWS headset, to upgrade the firmware of the TWS headset to firmware of a new version.

The TWS headset includes multiple independent devices, and each of the devices has a corresponding firmware. Therefore, a problem to be solved by those skilled in the art is how to reasonably and feasibly upgrade the multiple devices in the TWS headset based on the firmware of a new version.

SUMMARY

In view of this, a TWS headset, a charging box, a method for upgrading a TWS headset, and a storage medium are provided according to the present disclosure, to reasonably and feasibly upgrade the firmware in the TWS headset. The following technical solutions are provided according to the present disclosure.

In a first aspect, a method for upgrading a TWS headset is provided according the present disclosure. The method includes:

acquiring a firmware upgrade package from a preset terminal by a first audio output device;

upgrading the first audio output device based on a first upgrade firmware in the firmware upgrade package acquired by the first audio output device; and transmitting, by a charging box, a second upgrade firmware in the firmware upgrade package acquired by the first audio output device to a second audio output device, to upgrade the second audio output device based on the second upgrade firmware.

In one embodiment, the acquiring a firmware upgrade package from a preset terminal by a first audio output device includes:

acquiring, by the first audio output device, the firmware upgrade package from the preset terminal which is transmitted by the preset terminal after a message generation unit generates a first message, where the message generation unit is arranged in the preset terminal or in the TWS headset and is a virtual unit or a physical unit, and the message generation unit is configured to generate the first message in an external trigger generation manner or an internal active generation manner.

In one embodiment, the acquiring a firmware upgrade package from a preset terminal by a first audio output device includes:

acquiring, by the first audio output device, the firmware upgrade package from the preset terminal which is transmitted by the preset terminal after a message collection interface collects a second message, where the message collection interface is arranged in the preset terminal or in the TWS headset and is a voice feature collection interface, or an iris feature collection interface, or a fingerprint feature collection interface, or a facial feature collection interface, or a gesture feature collection interface.

In one embodiment, before upgrading any one of the first audio output device and the second audio output device, the method further includes:

detecting a state of the TWS headset;

determining whether the TWS headset is in a preset state;

if the TWS headset is not in the preset state, triggering a state adjustment prompt for adjusting the TWS headset to be in the preset state; and if the TWS headset is in the preset state, starting to upgrade the audio output device.

In one embodiment, the method for upgrading a TWS headset further includes:

during a process of upgrading any one of the first audio output device and the second audio output device, if it is detected that the TWS headset turns into a state different from the preset state, suspending the upgrading and recording upgrade progress information.

In one embodiment, the detecting a state of the TWS headset includes:

detecting a homing state of the audio output device; or detecting a wearing state and a power state of the audio output device; or detecting a play state and the power state of the audio output device; or detecting the homing state of the audio output device and an opening and closing state of a lid of the charging box.

The preset state indicates that: the audio output device is located at a charging position in the charging box; or the audio output device is not worn and a current remaining power of the audio output device is greater than or equal to a preset power; or the audio output device is not playing audio and the current remaining power of the audio output device is greater than or equal to the preset power; or the audio output device is located at the charging position in the charging box and the lid of the charging box is closed.

In one embodiment, before transmitting, by a charging box, a second upgrade firmware in the firmware upgrade package acquired by the first audio output device to a second audio output device, the method further includes:

comparing a version of a firmware of the first audio output device and a version of a firmware of the second audio output device, and where if the version of the firmware of the first audio output device is newer than the version of the firmware of the second audio output device, the second upgrade firmware is transmitted to the second audio output device by the charging box.

In one embodiment, the comparing a version of a firmware of the first audio output device and a version of a firmware of the second audio output device includes:

acquiring and comparing, by the charging box, the version of the firmware of the first audio output device and the version of the firmware of the second audio output device.

In one embodiment, the transmitting, by a charging box, a second upgrade firmware in the firmware upgrade package acquired by the first audio output device to a second audio output device includes:

Transmitting, by the charging box, the second upgrade firmware in the firmware upgrade package acquired by the first audio output device to the second audio output device through a wired communication interface; or Transmitting, by the charging box, the second upgrade firmware in the firmware upgrade package acquired by the first audio output device to the second audio output device through a wireless communication interface.

In one embodiment, after acquiring a firmware upgrade package from a preset terminal by a first audio output device, the method further includes:

comparing a version of a current firmware of the charging box and a version of a third upgrade firmware in the firmware upgrade package which corresponds to the charging box; and if the version of the firmware of the charging box is older than the version of the third upgrade firmware, transmitting the third upgrade firmware to the charging box from the first audio output device to upgrade the charging box based on the third upgrade firmware.

In a second aspect, an apparatus for upgrading a TWS headset is provided according to the present disclosure. The apparatus includes: a firmware acquisition module, a first upgrade module, and a firmware transmission module. The firmware acquisition module is configured to acquire a firmware upgrade package from a preset terminal by a first audio output device. The first upgrade module is configured to upgrade the first audio output device based on a first upgrade firmware in the firmware upgrade package acquired by the first audio output device. The firmware transmission module is configured to transmit, by a charging box, a second upgrade firmware in the firmware upgrade package acquired by the first audio output device to a second audio output device to upgrade the second audio output device based on the second upgrade firmware.

In a third aspect, a charging box is provided according to the present disclosure. The charging box includes: a processor and a memory. The processor is configured to perform, when executing a computer program stored in the memory, the following step of:

after a first audio output device acquires a firmware upgrade package from a preset terminal and is upgraded based on a first upgrade firmware in the firmware upgrade package, transmitting a second upgrade firmware in the firmware upgrade package acquired by the first audio output device to a second audio output device to upgrade the second audio output device based on the second upgrade firmware.

In one embodiment, a charging box includes a processor and a memory. The processor is configured to perform, when executing a computer program stored in the memory, the following step of:

after a first audio output device acquires a firmware upgrade package from a preset terminal and is upgraded based on a first upgrade firmware in the firmware upgrade package, transmitting a second upgrade firmware in the firmware upgrade package acquired by the first audio output device to a second audio output device to upgrade the second audio output device based on the second upgrade firmware.

In a fourth aspect, a TWS headset is provided according to the present disclosure. The TWS headset includes: a processor and a memory. The processor is configured to perform, when executing a computer program stored in the memory, the method for upgrading a TWS headset.

In a fifth aspect, a computer-readable storage medium storing a computer program is provided according to the present disclosure. The computer program, when executed by a processor, performs the method for upgrading a TWS headset.

According to the present disclosure, a firmware upgrade package is acquired from a preset terminal by a first audio output device arranged in the TWS headset, the first audio output device is upgraded based on the first upgrade firmware in the firmware upgrade package, then the second upgrade firmware in the firmware upgrade package acquired by the first audio output device is transmitted to the second audio output device by the charging box, thus the second audio output device is upgraded based on the second upgrade firmware transmitted by the charging box. It can be seen that, according to the present disclosure, the firmware upgrade package is acquired from a preset terminal by the first audio output device, the charging box, serving as a firmware transfer station for the TWS headset, acquires the second upgrade firmware corresponding to the second audio output device from the first audio output device after the first audio output device is upgraded, and transmits the second upgrade firmware to the second audio output device to upgrade the second audio output device based on the second upgrade firmware. With the above solutions according to the present disclosure, the firmware in the TWS headset can be upgraded reasonably and feasibly.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

Hereinafter, the technical solutions according to the present disclosure are explained clearly and completely in conjunction with the drawings in the embodiments of the present disclosure. It is apparent that the described embodiments are only a few rather than all of the embodiments according to the present disclosure. Any other embodiments obtained by those skilled in the art based on the embodiments according to the present disclosure without any creative work fall in the scope of the present disclosure.

According to the conventional technology, in order for the TWS headset to operate normally, in addition to necessary physical devices integrated in the TWS headset, it is required to install firmware for driving the physical devices in the TWS headset. It is difficult for firmware developers to develop perfect firmware most suitable for the TWS headset at the start. In many cases, after installing a version of firmware in the TWS headset, the firmware developers will develop a new version of the firmware during the actual use of the TWS headset. With the technical solutions according to the present disclosure, the TWS headset can be upgraded reasonably and feasibly based on the new version of the firmware.

Figure 1:
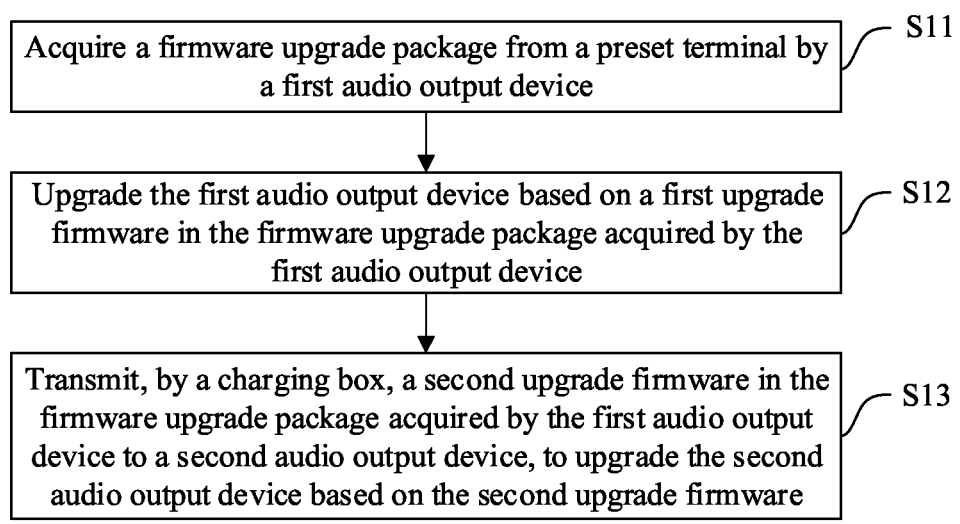
FIG. 1 is a flow chart of a method for upgrading a TWS headset according to the present disclosure.

A method for upgrading a TWS headset is provided according to an embodiment of the present disclosure. Referring to FIG. 1, the method includes the following steps S11 to S13.

In step S11, a firmware upgrade package is acquired from a preset terminal by a first audio output device.

It should be noted that, the TWS headset according to the embodiment includes a charging box and multiple audio output devices. The multiple audio output devices include two or more audio output devices. Accordingly, multiple charging positions are provided in the charging box, and each audio output device is charged at one corresponding charging position. The first audio output device in the embodiment is any one of the multiple audio output devices. The first audio output device may operate in a master mode, that is, the first audio output device in the embodiment may serve as a master headset. Alternatively, the first audio output device may operate in a slave mode, that is, the first audio output device in the embodiment may serve as a slave headset. Similarly, the second audio output device in the embodiment may be any one of the multiple audio output devices except the first audio output device, and the second audio output device may operate in the master mode or in the slave mode.

It should be understood that the preset terminal may include, but is not limited to, a smart phone, a computer, and a wearable smart device. The wearable device includes, but is not limited to, a smart watch, a smart bracelet, a pair of smart glasses, a Virtual Reality (VR) device, an Augmented Reality (AR) device, and an Mixed Reality (MR) device. In the embodiment, in order to facilitate data communications between the preset terminal and a server storing a new version of firmware upgrade package and between the preset terminal and the TWS headset, a dedicated application (APP) may be installed in the preset terminal in advance, to perform the data communications between the preset terminal and the server and between the preset terminal and the TWS headset by the APP.

In the embodiment, the firmware upgrade package acquired by the first audio output device includes an upgrade firmware applicable to the first audio output device and a upgrade firmware applicable to the second audio output device. In the embodiment, the upgrade firmware applicable to the first audio output device is called the first upgrade firmware, and the upgrade firmware applicable to the second audio output device is called the second upgrade firmware. The first upgrade firmware and the second first upgrade firmware may be separated from each other. The first upgrade firmware and the second first upgrade firmware in the firmware upgrade package may be the same upgrade firmware since different audio output devices may share the same upgrade firmware. In addition, in addition to the upgrade firmware for upgrading the audio output devices, the firmware upgrade package may include a third upgrade firmware for upgrading the charging box.

In one embodiment, the step in which a firmware upgrade package is acquired from a preset terminal by a first audio output device may be performed by: acquiring, by the first audio output device, the firmware upgrade package from the preset terminal which is transmitted by the preset terminal after a message generation unit generates a first message. The message generation unit is arranged in the preset terminal or in the TWS headset and is a virtual unit or a physical unit, and the message generation unit is configured to generate the first message in an external trigger generation manner or an internal active generation manner.

In the embodiment, the message generation unit may be a first-type message generation unit, which is configured to generate the first message in the external trigger generation manner and is arranged in the preset terminal. For example, the message generation unit may be a physical unit, such as a physical button, integrated in the preset terminal in advance. The message generation unit may also be a virtual unit, such as a virtual button, generated by the preset terminal after the preset terminal detects that a new firmware upgrade package is stored in the server. Accordingly, before the first-type message generation unit in the preset terminal generates the first message, the preset terminal may detect whether the server stores the new firmware upgrade package. If the server stores the new firmware upgrade package, a prompt message may be generated at the preset terminal by means of a screen display, a voice play or a vibration at a certain frequency, to prompt the user to determine whether to upgrade the firmware. After the user notices the prompt message and triggers the first-type message generation unit to generate the first message containing a user confirmation upgrade instruction, the preset terminal downloads the firmware upgrade package from the server and transmits the firmware upgrade package to the first audio output device.

In the embodiment, the message generation unit may be a second-type message generation unit, which is configured to generate the first message in the external trigger generation manner and is arranged in the TWS headset. For example, the message generation unit may be an audio output device integrated in the TWS headset in advance or a physical button on the charging box. The message generation unit may also be a virtual button generated on a preset display screen of the charging box after the TWS headset determines that the server stores a new version of firmware. Accordingly, before the second-type message generation unit in the TWS headset generates the first message, the preset terminal may transmit the version number of the new version of firmware stored in the server to the audio output device in the TWS headset or to the charging box. If the TWS headset detects, in an automatic detection manner, that the version number of the currently installed firmware is older than the received version number of the new version of firmware, a prompt message may be generated by means of a voice prompt, a vibration at a certain frequency, or a screen display on the preset display screen of the charging box, to prompt the user to determine whether to upgrade the firmware. After the user notices the prompt message and triggers the second-type message generation unit to generate the first message containing a user confirmation upgrade instruction, the TWS headset transmits the first message to the preset terminal, and the preset terminal downloads the firmware upgrade package from the server and transmits the firmware upgrade package to the first audio output device.

In the embodiment, the message generation unit may be a third-type message generation unit, which may be a virtual unit or a physical unit for generating the first message in the internal active generation manner and is arranged in the preset terminal. Accordingly, before the third-type message generation unit in the preset terminal generates the first message, the preset terminal may detect whether the server stores a new firmware upgrade package. If the server stores the new firmware upgrade package, the third-type message generation unit is controlled to generate the first message containing an automatic confirmation upgrade instruction, and the preset terminal downloads the firmware upgrade package from the server and transmits the firmware upgrade package to the first audio output device.

In the embodiment, the message generation unit may be a fourth-type message generation unit, which may be a virtual unit or a physical unit for generating the first message in an internal active generation manner and is arranged in the TWS headset. Accordingly, before the fourth-type message generation unit in the TWS headset generates the first message, the preset terminal may transmit the version number of the new version of firmware stored in the server to the audio output device in the TWS headset or to the charging box. If the TWS headset detects, in an automatic detection manner, that the version number of the currently installed firmware is older than the received version number of the new version of firmware, the fourth-type message generation unit is controlled to generate the first message containing an automatic confirmation upgrade instruction, and the TWS headset transmits the first message to the preset terminal, then the preset terminal downloads the firmware upgrade package from the server and transmits the firmware upgrade package to the first audio output device.

It should be understood that the server may be a physical server or a cloud server.

In one embodiment, in order to prevent unauthorized users from upgrading the firmware of the TWS headset, the step in which a firmware upgrade package transmitted is acquired from a preset terminal by a first audio output device may be performed by: acquiring, by the first audio output device, the firmware upgrade package from the preset terminal which is transmitted by the preset terminal after a message collection interface of the preset terminal collects a second message. The message collection interface is arranged in the preset terminal or in the TWS headset and is a voice feature collection interface, or an iris feature collection interface, or a fingerprint feature collection interface, or a facial feature collection interface, or a gesture feature collection interface.

In the embodiment, the message collection interface may be configured to collect feature data, such as voice feature data, iris feature data, fingerprint feature data, facial feature data, or gesture feature data. The second message may include preset feature data corresponding to an authorized user. It should be understood that in the embodiment, before the message collection interface collects feature data, the preset terminal or the TWS headset may detect whether the server stores a new firmware upgrade package. If the server stores the new firmware upgrade package, the message collection interface is activated to collect feature data, and then it is determined whether the collected feature data is the same as the preset feature data. If the collected feature data is the same as the preset feature data, the preset terminal downloads the new firmware upgrade package from the server and transmits new firmware upgrade package to the first audio output device. Therefore, the firmware upgrade package is transmitted in the above way, it can be ensured that only the preset authorized user can trigger to upgrade the firmware in the TWS headset, thereby improving the user's experience. It should be understood that according to the embodiment, it is required to bind the TWS headset with preset feature data such as fingerprint features and iris features of the authorized user in advance.

In step S12, the first audio output device is upgraded based on a first upgrade firmware in the firmware upgrade package acquired by the first audio output device.

That is, after acquiring the firmware upgrade package, the first audio output device may be upgraded by itself based on the first upgrade firmware in the firmware upgrade package.

During a process of upgrading any devices having a firmware in the TWS headset, if the upgrading is interrupted, upgrade progress information may be recorded. Then, the upgrading may be continued based on the recorded upgrade progress information once the upgrade process is resumed. It should be understood that the devices having a firmware in the TWS headset includes audio output devices and a charging box.

In step S13, a second upgrade firmware in the firmware upgrade package acquired by the first audio output device is transmitted to a second audio output device by a charging box to upgrade the second audio output device based on the second upgrade firmware.

It should be understood that according to the embodiment, in order to avoid repeated upgrade processes, before the step in which the second upgrade firmware in the firmware upgrade package acquired by the first audio output device is transmitted to the second audio output device by the charging box, the method may further include:

comparing a version of a firmware of the first audio output device and a version of a firmware of the second audio output device. If the version of the firmware of the first audio output device is newer than the version of the firmware of the second audio output device, the second upgrade firmware is transmitted to the second audio output device by the charging box.

In one embodiment, the comparing a version of a firmware of the first audio output device and a version of a firmware of the second audio output device may include:

acquiring and comparing the version of the firmware of the first audio output device and the version of the firmware of the second audio output device by the charging box.

In the embodiment, after the first audio output device is upgraded, a prompt message for prompting that the first audio output device has been upgraded may be generated at the preset terminal or the TWS headset. After the user notices the prompt message and presses a preset button on the preset terminal or on the TWS headset, the charging box transmits a version query command to the first audio output device and the second audio output device via a preset communication interface to acquire the version of the firmware of the first audio output device and the version of the firmware of the second audio output device, and compares the version of the firmware of the first audio output device and the version of the firmware of the second audio output device. The preset communication interface may be a Bluetooth Low Energy (BLE) interface, or a USB communication interface, or the like.

In the embodiment, in order to minimize the manual intervention by the user and improve the user's experience, after the first audio output device is upgraded, the charging box may actively transmits the version query command to the first audio output device and the second audio output device via the preset communication interface to acquire the version of the firmware of the first audio output device and the version of the firmware of the second audio output device, and then compares the version of the firmware of the first audio output device and the version of the firmware of the second audio output device.

In one embodiment, the comparing a version of a firmware of the first audio output device and a version of a firmware of the second audio output device may include:

transmitting, by the charging box, the version of the firmware of the first audio output device to the second audio output device, and comparing, by the second audio output device, the version of the current firmware of the second audio output device and the acquired version of the firmware of the first audio output device.

It should be understood that if the second audio output device determines that the version of the firmware of the second audio output device is older than the version of the firmware of the first audio output device by performing comparison, the second audio output device may transmit a firmware transfer request to the charging box, so that the charging box transmits the second upgrade firmware in the firmware upgrade package from the first audio output device to the second audio output device in response to the firmware transfer request.

In one embodiment, the transmitting, by a charging box, a second upgrade firmware in the firmware upgrade package from the first audio output device to a second audio output device may include:

transmitting the second upgrade firmware in the firmware upgrade package acquired by the first audio output device to the second audio output device by the charging box through a wired communication interface; or transmitting, by the charging box, the second upgrade firmware in the firmware upgrade package acquired by the first audio output device to the second audio output device through a wireless communication interface.

The wired communication interface may be a USB communication interface, and the wireless communication interface may be a BLE interface.

It should be noted that in the step S13 according to the embodiment, the charging box may transmit the second upgrade firmware acquired by the first audio output device to the second audio output device in real time.

In the embodiment, in order to prevent all of the audio output devices in the TWS headset from being in a state of transmitting firmware, receiving firmware or upgrading firmware simultaneously, so as to minimize the influence to the user due to the processes of transmitting firmware, receiving firmware or upgrading firmware while the user is using the TWS headset, the second upgrade firmware may be transmitted from the first audio output device to the charging box and is stored. After completely storing the second upgrade firmware, the charging box transmits the stored second upgrade firmware to the second audio output device. In this way, when the first audio output device transmits the second upgrade firmware to the charging box, the second audio output device is in a normal operation state, rather than in the state of transmitting firmware, receiving firmware or upgrading firmware, and when the second audio output device receives the second upgrade firmware from the charging box or is upgraded based on the second upgrade firmware, the first audio output device is in a normal operation state.

In the embodiment, the firmware upgrade package transmitted from the preset terminal is acquired by the first audio output device arranged in the TWS headset, the first audio output device is upgraded based on the first upgrade firmware in the firmware upgrade package, and the second upgrade firmware in the firmware upgrade package acquired by the first audio output device is transmitted to the second audio output device by the charging box, then the second audio output device is upgraded based on the second upgrade firmware transmitted by the charging box. It can be seen that, according to the embodiment of the present disclosure, the firmware upgrade package is acquired from a preset terminal by the first audio output device, and the charging box, serving as a firmware transfer station for the TWS headset, acquires the second upgrade firmware corresponding to the second audio output device from the first audio output device after the first audio output device is upgraded and transmits the second upgrade firmware to the second audio output device to upgrade the second audio output device based on the second upgrade firmware. With the above solutions according to the embodiments of the present disclosure, the firmware in the TWS headset can be upgraded reasonably and feasibly.

Figure 2:
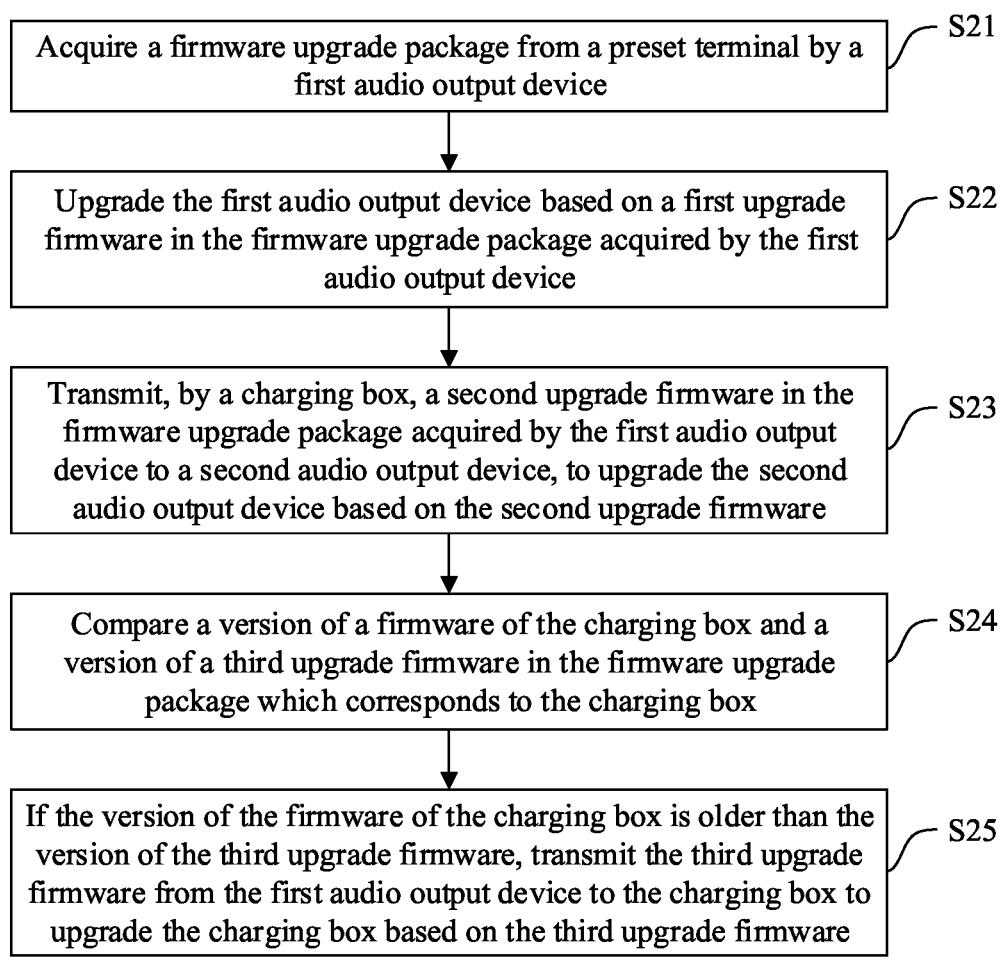
FIG. 2 is a flow chart of a method for upgrading a TWS headset according to the present disclosure.

Referring to FIG. 2, a method for upgrading a TWS headset is provided according to an embodiment of the present disclosure. The method includes the following steps S21 to S25.

In step S21, a firmware upgrade package is acquired from a preset terminal by a first audio output device.

In step S22, the first audio output device is upgraded based on a first upgrade firmware in the firmware upgrade package acquired by the first audio output device.

In step S23, a second upgrade firmware in the firmware upgrade package acquired by the first audio output device is transmitted to a second audio output device by a charging box to upgrade the second audio output device based on the second upgrade firmware.

For the details of steps S21 to S23, reference may be made to the description of the above embodiments, which is not described herein again.

In step S24, a version of a firmware of the charging box is compared with a version of a third upgrade firmware in the firmware upgrade package which corresponds to the charging box.

In the embodiment, the charging box may compare, after the second audio output device is upgraded, the version of the firmware of the charging box with the version of the third upgrade firmware in the firmware upgrade package which corresponds to the charging box to determine whether the version of the current firmware of the charging box is older than the version of the third upgrade firmware.

In step S25, if the version of the firmware of the charging box is older than the version of the third upgrade firmware, the third upgrade firmware is transmitted from the first audio output device to the charging box to upgrade the charging box based on the third upgrade firmware.

It can be seen that according to the embodiment, the firmware of the first audio output device is upgraded firstly, then the firmware of the second audio output device is upgraded, and finally the firmware of the charging box upgraded, thereby realizing a reasonable and feasible upgrade process.

Figure 3:
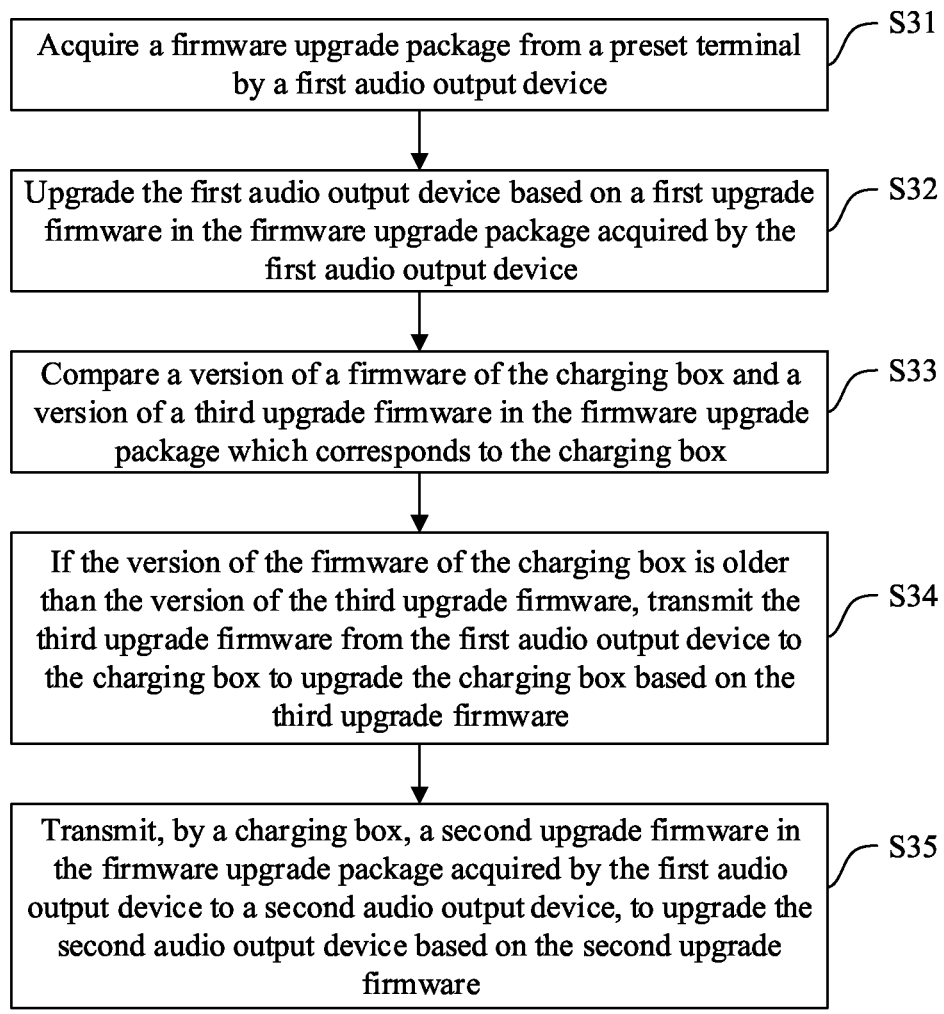
FIG. 3 is a flow chart of a method for upgrading a TWS headset according to the present disclosure.

Referring to FIG. 3, a method for upgrading a TWS headset is provided according to an embodiment of the present disclosure. The method includes the following steps S31 to S35.

In step S31, a firmware upgrade package is acquired from a preset terminal by a first audio output device.

In step S32, the first audio output device is upgraded based on a first upgrade firmware in the firmware upgrade package acquired by the first audio output device.

For the details of steps S31 and S32, reference may be made to the description of the above embodiments, which is not described herein again.

In step S33, a version of a firmware of the charging box is compared with a version of a third upgrade firmware in the firmware upgrade package which corresponds to the charging box.

In the embodiment, the charging box compares, after the first audio output device is upgraded, the version of the firmware of the charging box with the version of the third upgrade firmware in the firmware upgrade package which corresponds to the charging box to determine whether the version of the current firmware of the charging box is older than the version of the third upgrade firmware.

In step S34, if the version of the current firmware of the charging box is older than the version of the third upgrade firmware, the third upgrade firmware is transmitted from the first audio output device to the charging box to upgrade the charging box based on the third upgrade firmware.

In step S35, a second upgrade firmware in the firmware upgrade package acquired by the first audio output device is transmitted to a second audio output device by a charging box to upgrade the second audio output device based on the second upgrade firmware.

It can be seen that according to the embodiment, the firmware of the first audio output device is upgraded firstly, then the firmware of the charging box upgraded, and finally the firmware of the second audio output device is upgraded, thereby realizing a reasonable and feasible upgrade process.

Figure 4:
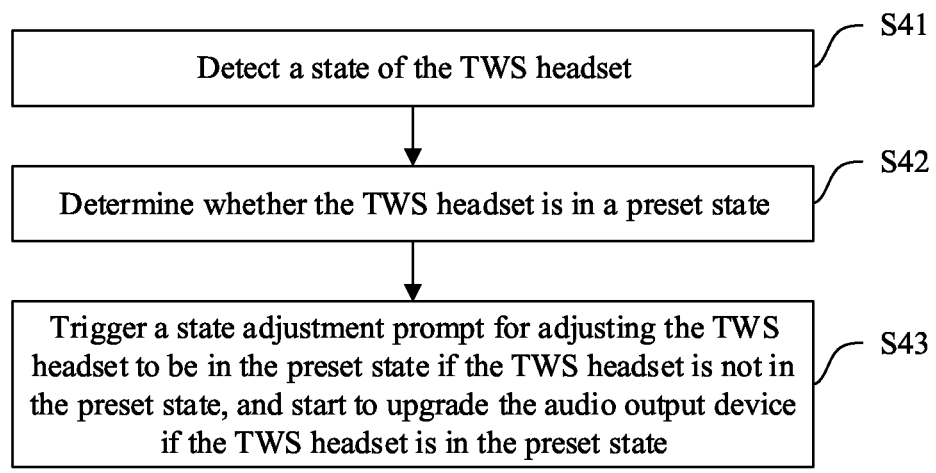
FIG. 4 is a flow chart of a sub-process of a method for upgrading a TWS headset according to the present disclosure.

Referring to FIG. 4, before updating any one of the audio output devices, the method according to any one of the above embodiments further includes following steps S41 to S43.

In step S41, a state of the TWS headset is detected.

In step S42, it is determined whether the TWS headset is in a preset state.

The step S41 in which the state of the TWS headset is detected includes:

detecting a homing state of the audio output device; or detecting a wearing state and a power state of the audio output device; or detecting a play state and the power state of the audio output device; or detecting the homing state of the audio output device and an opening and closing state of a lid of the charging box.

The preset state indicates that: the audio output device is located at a charging position in the charging box; or the audio output device is currently not worn and a current remaining power of the audio output device is greater than or equal to a preset power; or the audio output device is not playing audio and the current remaining power of the audio output device is greater than or equal to the preset power; or the audio output device is located at the charging position in the charging box and the lid of the charging box is closed.

It should be understood that in the embodiment, the homing state indicates whether the audio output device is located at a charging position in the charging box, the wearing state indicates whether the audio output device is currently worn by the user, the play state indicates whether the audio output device is currently playing audio, the power state indicates the current remaining power of the audio output device, and the state of the lid of the charging box indicates whether the lid of the current charging box is currently opened or closed.

In the embodiment, the homing state of the audio output device may be determined by detecting a current flowing through a preset electrical contact at the charging position or by a proximity switch which is arranged at the charging position in advance.

In the embodiment, the wearing state of the audio output device may be determined by analyzing the data collected by a physical sign sensor and an acceleration sensor which are integrated in the audio output device in advance. Specifically, it may be determined whether the physical sign sensor has collected physical sign data. If the physical sign sensor has collected physical sign data, it indicates that the audio output device is in contact with the human body. In this case, acceleration data collected by the acceleration sensor may be acquired, and it is determined whether the audio output device is currently worn or not worn by analyzing the acquired acceleration data based on a significant difference between acceleration data obtained when the audio output device is currently worn and acceleration data obtained when the audio output device is not worn. In the embodiment, the physical sign sensor may include, but is not limited to, a temperature sensor, an infrared sensor, a pressure sensor, and a distance sensor.

In the embodiment, the state of the lid of the charging box may be detected by a proximity switch arranged in the charging box.

In step S43, if the TWS headset is not in the preset state, a state adjustment prompt is triggered for adjusting the TWS headset to be in the preset state; and if the TWS headset is in the preset state, it is started to upgrade the audio output device.

For example, assuming that the preset state indicates that the audio output device is currently located at the charging position in the charging box and the lid of the charging box is closed, a state adjustment prompt may be triggered if the audio output device is located at the charging position in the charging box and the lid of the charging box is opened, to prompt the user to close the lid of the charging box. For example, assuming that the preset state indicates that the audio output device is currently not worn and the current remaining power of the audio output device is greater than or equal to the preset power, a state adjustment prompt may be triggered if the audio output device is currently worn and the current remaining power of the audio output device is less than the preset power, to prompt the user to take off the audio output device and charge the audio output device.

It should be understood that in the embodiment, the state adjustment prompt may be a screen display prompt, or a voice prompt, or the like.

In one embodiment, the state adjustment prompt may be triggered on a preset terminal, so as to adjust the TWS headset to be in the preset state under an intervention of the user.

In one embodiment, the state adjustment prompt may be triggered on a TWS headset, so as to adjust the TWS headset to be in the preset state under an intervention of the user.

In one embodiment, the method for upgrading a TWS headset further includes:

during a process of upgrading any one of the audio output devices, if it is detected that the TWS headset turns to a state different from the preset state, suspending the upgrading and recording upgrade progress information, so that the upgrading may be continued based on the recorded upgrade progress information when the process of upgrading is resumed.

For example, assuming that the preset state indicates that the audio output device is currently located at the charging position in the charging box and the lid of the charging box is closed, if it is detected that the lid of the charging box is opened during the process of upgrading any audio output device, the upgrading may be suspended and the upgrade progress information may be recorded.

Figure 5:
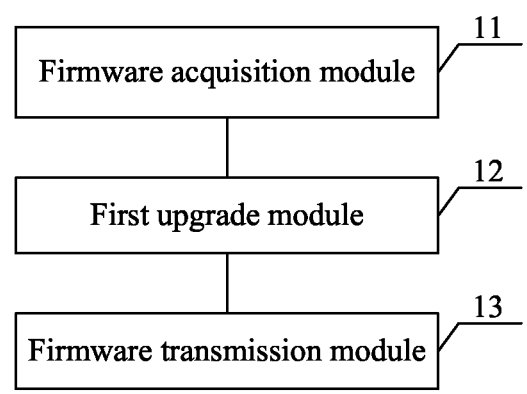
FIG. 5 is a schematic structural diagram of an apparatus for upgrading a TWS headset according the present disclosure.

Referring to FIG. 5, an apparatus for upgrading a TWS headset is further provided according to an embodiment of the present disclosure. The apparatus includes a firmware acquisition module 11, a first upgrade module 12, and a firmware transmission module 13.

The firmware acquisition module 11 is configured to acquire a firmware upgrade package from a preset terminal by a first audio output device.

The first upgrade module 12 is configured to upgrade the first audio output device based on a first upgrade firmware in the firmware upgrade package acquired by the first audio output device.

The firmware transmission module 13 is configured to transmit, by a charging box, a second upgrade firmware in the firmware upgrade package acquired by the first audio output device to a second audio output device, to upgrade the second audio output device based on the second upgrade firmware.

For the detail operating processes of the above modules, reference may be made to the description of the above embodiments, which is not described herein again.

A charging box is further provided according to an embodiment of the present disclosure. The charging box includes: a processor and a memory. The processor is configured to perform, when executing a computer program stored in the memory, the following step:

after a first audio output device acquires a firmware upgrade package from a preset terminal and is upgraded based on a first upgrade firmware in the firmware upgrade package, transmitting a second upgrade firmware in the firmware upgrade package acquired by the first audio output device to a second audio output device, to upgrade the second audio output device based on the second upgrade firmware.

In one embodiment, the processor in the charging box may be further configured to perform, when executing the computer program stored in the memory, the following steps:

comparing a version of a current firmware of the charging box and a version of a third upgrade firmware in the firmware upgrade package which corresponds to the charging box; and if the version of the firmware of the charging box is older than the version of the third upgrade firmware, acquiring the third upgrade firmware transmitted from the first audio output device and upgrade the charging box based on the third upgrade firmware.

Figure 6:
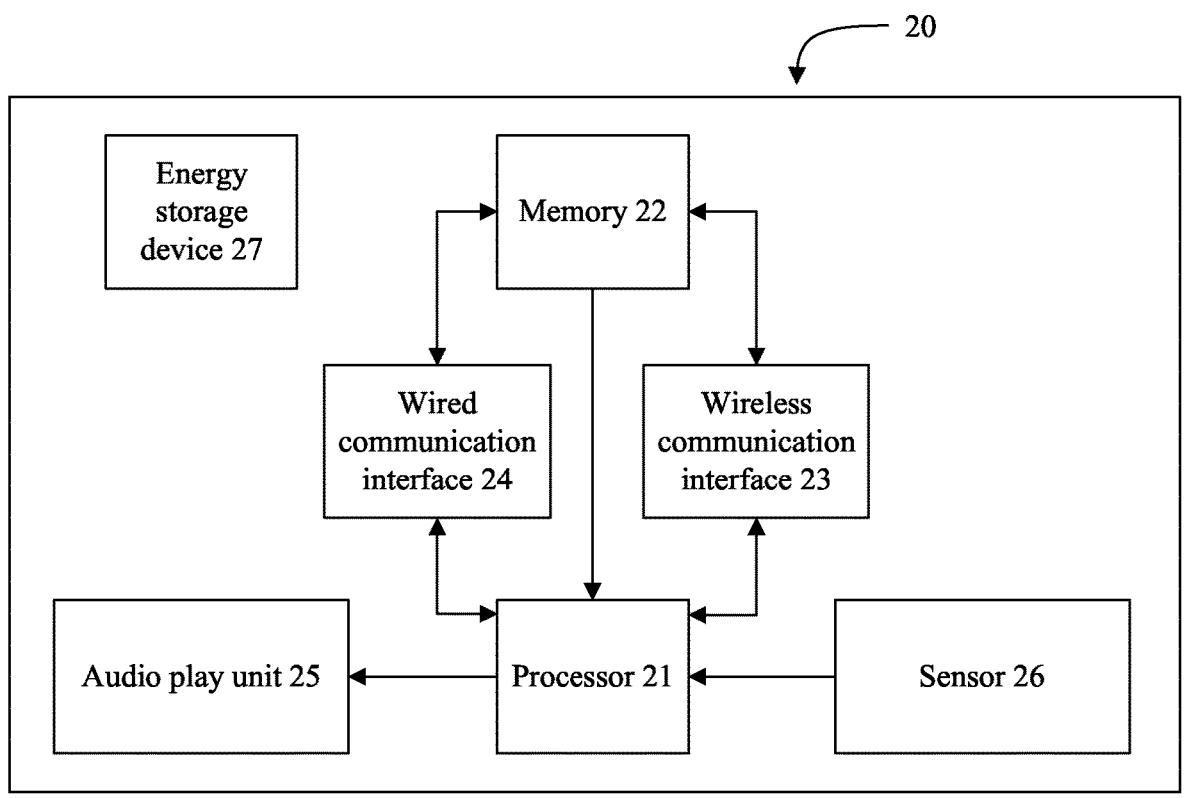
FIG. 6 is a schematic structural diagram of a TWS headset according the present disclosure.

Referring to FIG. 6, a TWS headset 20 is further provided according to an embodiment of the present disclosure. The TWS headset 20 includes a processor 21 and a memory 22.

The processor 21 is configured to perform, when executing a computer program stored in the memory 22, the following steps:

acquiring a firmware upgrade package from a preset terminal by a first audio output device;

upgrading the first audio output device based on a first upgrade firmware in the firmware upgrade package acquired by the first audio output device; and transmitting, by a charging box, a second upgrade firmware in the firmware upgrade package acquired by the first audio output device to a second audio output device, to upgrade the second audio output device based on the second upgrade firmware.

In the embodiment, the processor 21 may be configured to perform, when executing the computer program stored in the memory 22, the following step: acquiring, by the first audio output device, the firmware upgrade package from the preset terminal which is transmitted by the preset terminal after a message generation unit generates a first message. The message generation unit is arranged in the preset terminal or in the TWS headset and is a virtual unit or a physical unit, and the message generation unit generates the first message in an external trigger generation mode or an internal active generation mode.

In the embodiment, the processor 21 may be configured to perform, when executing the computer program stored in the memory 22, the following step: acquiring, by the first audio output device, the firmware upgrade package from the preset terminal which is transmitted by the preset terminal after a message collection interface of the preset terminal collects a second message. The message collection interface is arranged in the preset terminal or in the TWS headset and is a voice feature collection interface, or an iris feature collection interface, or a fingerprint feature collection interface, or a facial feature collection interface, or a gesture feature collection interface.

In the embodiment, the processor 21 may be configured to perform, when executing the computer program stored in the memory 22, the following steps:

before upgrading any one of the audio output devices, detecting a state of the TWS headset; determining whether the TWS headset is in a preset state; if the TWS headset is not in the preset state, triggering a state adjustment prompt for adjusting the state of the TWS headset to the preset state; and if the TWS headset is in the preset state, starting to upgrade the audio output device.

In the embodiment, the processor 21 may be configured to perform, when executing the computer program stored in the memory 22, the following steps:

during a process of upgrading any one of the audio output devices, if it is detected that the TWS headset turns into a state different from the preset state, suspending the upgrading and recording upgrade progress information.

In the embodiment, the processor 21 may be configured to perform, when executing the computer program stored in the memory 22, the following steps: detecting a homing state of the audio output device; or detecting a wearing state and a power state of the audio output device; or detecting a play state and the power state of the audio output device; or detecting the homing state of the audio output device and a state of a lid of the charging box. The preset state indicates that: the audio output device is located at a charging position in the charging box; or the audio output device is not worn and a current remaining power of the audio output device is greater than or equal to a preset power; or the audio output device is not playing audio and the current remaining power of the audio output device is greater than or equal to the preset power; or the audio output device is located at the charging position in the charging box and the lid of the charging box is closed.

In the embodiment, the processor 21 may be configured to perform, when executing the computer program stored in the memory 22, the following steps:

comparing a version of a firmware of the first audio output device and a version of a firmware of the second audio output device. If the version of the firmware of the first audio output device is newer than the version of the firmware of the second audio output device, the second upgrade firmware is transmitted to the second audio output device by the charging box.

In the embodiment, the processor 21 may be configured to perform, when executing the computer program stored in the memory 22, the following step:

acquiring and comparing, by the charging box, the version of the firmware of the first audio output device and the version of the firmware of the second audio output device.

In the embodiment, the processor 21 may be configured to perform, when executing the computer program stored in the memory 22, the following step:

transmitting, by the charging box, the second upgrade firmware in the firmware upgrade package acquired by the first audio output device to the second audio output device through a wired communication interface; or transmitting, by the charging box, the second upgrade firmware in the firmware upgrade package acquired by the first audio output device to the second audio output device through a wireless communication interface.

In the embodiment, the processor 21 may be configured to perform, when executing the computer program stored in the memory 22, the following steps:

comparing a version of a current firmware of the charging box and a version of a third upgrade firmware in the firmware upgrade package which corresponds to the charging box; and if the version of the firmware of the charging box is older than the version of the third upgrade firmware, transmitting the third upgrade firmware to the charging box from the first audio output device to upgrade the charging box based on the third upgrade firmware.

It should be noted that the processor 21 according to the embodiment may include multiple processing units, and the memory 22 may include multiple storage units. Some of the processing units and some of the storage units are arranged in the charging box, and some of the processing units and some of the storage units are arranged in the audio output devices. Compared with the technical solutions in the above embodiments, the number and the locations of the processing units and the storage units in the TWS headset 20 in the embodiment may be different from that in the above embodiments, which may be set according to actual conditions and is not described herein.

In one embodiment, the TWS headset 20 further includes a wireless communication interface 23, a wired communication interface 24, an audio play unit 25, a sensor 26, and energy storage devices 27.

The wireless communication interface 23 is configured to acquire various parameters from the preset terminal and transmit various parameters to the preset terminal in a wireless communication manner, or transmit parameters between different devices in the TWS headset 20, or acquire externally imported program codes in a wireless communication manner. The wireless communication interface 23 may be a BLE interface, and may be arranged in the audio output devices of the TWS headset or the charging box.

The wired communication interface 24 is configured to acquire various parameters from the preset terminal and transmit various parameters to the preset terminal in a wired communication manner, or transmit parameters between different devices in the TWS headset 20, or acquire externally imported program codes in a wired communication manner. The wired communication interface 24 may be a USB interface, and may be arranged in the audio output devices of the TWS headset or the charging box.

The audio play unit 25 is configured to play audio signals, and is arranged in each of the audio output devices of the TWS headset.

The sensor 26 is configured to collect the physical sign data of the user and the acceleration data of the audio output devices, or detect the state of the lid of the charging box. The sensor 26 may include a physical sign sensor, an acceleration sensor, and a proximity switch.

The energy storage devices 27 are arranged in the charging box for charging the audio output devices, and are respectively arranged in the audio output devices for supply electrical energy for electronic elements in the audio output devices.

A computer-readable storage medium storing a computer program is further provided according to an embodiment of the present disclosure. The computer program, when executed by a processor, performs the method for upgrading a TWS headset. For the detail steps of the method, reference may be made to the description of the above embodiments, which is not described herein again.

The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method.

It may be further known by those skilled in the art that, units and steps in each method described in conjunction with the embodiments disclosed herein can be realized by electronic hardware, computer software, or a combination thereof. In order to clearly illustrate interchangeability of the hardware and the software, steps and composition of each embodiment have been described generally in view of functions in the above specification. Whether the function is executed in a hardware way or in a software way depends on specific application of the technical solution and design constraint condition. Those skilled in the art can use different methods for each specific application to realize the described function, and this is not considered to be beyond the scope of the present disclosure.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

Finally, it should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article, or device including multiple elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

A TWS headset, a charging box, a method for upgrading a TWS headset, and a storage medium are described in detail hereinbefore. The principle and the embodiments of the present disclosure are illustrated herein by specific examples. The above description of examples is only intended to help the understanding of the method and idea of the present disclosure. For those skilled in the art, modification may be made to the specific embodiment and application range according to the concept of the present disclosure. In summary, the contents of this specification should not be interpreted as limitation to the present disclosure.

The invention claimed is:

1. A method for upgrading a True Wireless Stereo (TWS) headset, comprising:
    acquiring a firmware upgrade package from a preset terminal by a first audio output device;
    upgrading the first audio output device based on a first upgrade firmware in the firmware upgrade package acquired by the first audio output device; and
    transmitting, by a charging box, a second upgrade firmware in the firmware upgrade package acquired by the first audio output device to a second audio output device, to upgrade the second audio output device based on the second upgrade firmware.

2. The method for upgrading a TWS headset according to claim 1, wherein the acquiring a firmware upgrade package from a preset terminal by a first audio output device comprises:
    acquiring, by the first audio output device, the firmware upgrade package from the preset terminal which is transmitted by the preset terminal after a message generation unit generates a first message, wherein the message generation unit is arranged in the preset terminal or in the TWS headset and is a virtual unit or a physical unit, and the message generation unit is configured to generate the first message in an external trigger generation manner or an internal active generation manner.

3. The method for upgrading a TWS headset according to claim 1, wherein the acquiring a firmware upgrade package from a preset terminal by a first audio output device comprises:
    acquiring, by the first audio output device, the firmware upgrade package from the preset terminal which is transmitted by the preset terminal after a message collection interface collects a second message, wherein the message collection interface is arranged in the preset terminal or in the TWS headset and is a voice feature collection interface, or an iris feature collection interface, or a fingerprint feature collection interface, or a facial feature collection interface, or a gesture feature collection interface.

4. The method for upgrading a TWS headset according to claim 1, wherein before upgrading any one of the first audio output device and the second audio output device, the method further comprises:
    detecting a state of the TWS headset;
    determining whether the TWS headset is in a preset state;
    if the TWS headset is not in the preset state, triggering a state adjustment prompt for adjusting the TWS headset to be in the preset state; and
    if the TWS headset is in the preset state, starting to upgrade the one of the first audio output device and the second audio output device.

5. The method for upgrading a TWS headset according to claim 4, further comprising:
    during a process of upgrading any one of the first audio output device and the second audio output device, if it is detected that the TWS headset turns into a state different from the preset state, suspending the upgrading and recording upgrade progress information.

6. The method for upgrading a TWS headset according to claim 4, wherein the detecting a state of the TWS headset comprises:
    detecting a homing state of the audio output device; or
    detecting a wearing state and a power state of the audio output device; or
    detecting a play state and the power state of the audio output device; or
    detecting the homing state of the audio output device and a state of a lid of the charging box,
    wherein the preset state indicates that: the audio output device is located at a charging position in the charging box; or the audio output device is not worn and a current remaining power of the audio output device is greater than or equal to a preset power; or the audio output device is not playing audio and the current remaining power of the audio output device is greater than or equal to the preset power; or the audio output device is located at the charging position in the charging box and the lid of the charging box is closed.

7. The method for upgrading a TWS headset according to claim 1, wherein before transmitting, by a charging box, a second upgrade firmware in the firmware upgrade package acquired by the first audio output device to a second audio output device, the method further comprises:
    comparing a version of a firmware of the first audio output device and a version of a firmware of the second audio output device, and wherein
    if the version of the firmware of the first audio output device is newer than the version of the firmware of the second audio output device, the second upgrade firmware is transmitted to the second audio output device by the charging box.

8. The method for upgrading a TWS headset according to claim 7, wherein the comparing a version of a firmware of the first audio output device and a version of a firmware of the second audio output device comprises:
    acquiring and comparing, by the charging box, the version of the firmware of the first audio output device and the version of the firmware of the second audio output device.

9. The method for upgrading a TWS headset according to claim 1, wherein the transmitting, by a charging box, a second upgrade firmware in the firmware upgrade package acquired by the first audio output device to a second audio output device comprises:
    transmitting, by the charging box, the second upgrade firmware in the firmware upgrade package acquired by the first audio output device to the second audio output device through a wired communication interface; or
    transmitting, by the charging box, the second upgrade firmware in the firmware upgrade package acquired by the first audio output device to the second audio output device through a wireless communication interface.

10. The method for upgrading a TWS headset according to claim 1, wherein after acquiring a firmware upgrade package from a preset terminal by a first audio output device, the method further comprises:

comparing a version of a current firmware of the charging box and a version of a third upgrade firmware in the firmware upgrade package that corresponds to the charging box; and if the version of the firmware of the charging box is older than the version of the third upgrade firmware, transmitting the third upgrade firmware to the charging box from the first audio output device to upgrade the charging box based on the third upgrade firmware.

11. A True Wireless Stereo (TWS) headset, comprising:

a memory; and a processor configured to perform, when executing a computer program stored in the memory, the method for upgrading a TWS headset according to claim 1.

12. A computer-readable storage medium storing a computer program, wherein the computer program, when executed by a processor, performs the method for upgrading a True Wireless Stereo (TWS) headset according to claim 1.

13. An apparatus for upgrading a True Wireless Stereo (TWS) headset, comprising:

a firmware acquisition module, configured to acquire a firmware upgrade package from a preset terminal by a first audio output device;

a first upgrade module, configured to upgrade the first audio output device based on a first upgrade firmware in the firmware upgrade package acquired by the first audio output device; and a firmware transmission module, configured to transmit, by a charging box, a second upgrade firmware in the firmware upgrade package acquired by the first audio output device to a second audio output device, to upgrade the second audio output device based on the second upgrade firmware.

14. A charging box, comprising:

a memory; and a processor configured to perform, when executing a computer program stored in the memory, the following step of:

after a first audio output device acquires a firmware upgrade package from a preset terminal and is upgraded based on a first upgrade firmware in the firmware upgrade package, transmitting a second upgrade firmware in the firmware upgrade package acquired by the first audio output device to a second audio output device to upgrade the second audio output device based on the second upgrade firmware.

15. The charging box according to claim 14, wherein the processor is further configured to perform, when executing a computer sub program stored in the memory, the following steps of:

comparing a version of a firmware of the charging box and a version of a third upgrade firmware in the firmware upgrade package which corresponds to the charging box; and if the version of the firmware of the charging box is older than the version of the third upgrade firmware, acquiring the third upgrade firmware transmitted from the first audio output device, to upgrade the charging box based on the third upgrade firmware.

\* \* \* \* \*